United States Patent [19]

Phillips et al.

[11] Patent Number: 5,575,071
[45] Date of Patent: Nov. 19, 1996

[54] TOOLLESS QUICKCHANGE BLADE CLAMP FOR RECIPROCATING SAWS

[75] Inventors: Alan Phillips; John W. Schnell, both of Jackson, Tenn.

[73] Assignee: Porter-Cable Corporation, Jackson, Tenn.

[21] Appl. No.: 456,022

[22] Filed: May 31, 1995

Related U.S. Application Data

[63] Continuation-in-part of Ser. No. 183,717, Jan. 19, 1994, abandoned.

[51] Int. Cl.⁶ ..................................................... B27B 19/09
[52] U.S. Cl. ................................ 30/392; 30/337; 279/71; 279/81
[58] Field of Search ............................. 30/392, 393, 339, 30/337; 279/71, 75, 81, 905

[56] References Cited

U.S. PATENT DOCUMENTS

| | | | |
|---|---|---|---|
| 666,511 | 1/1901 | Furbish | 279/81 |
| 1,124,981 | 1/1915 | Weaver . | |
| 1,341,934 | 6/1920 | Schoenborn . | |
| 1,602,708 | 10/1926 | Russell . | |
| 1,781,442 | 11/1930 | Currier . | |
| 2,684,491 | 7/1954 | Roddick . | |
| 2,926,020 | 2/1960 | Dayton et al. . | |
| 3,185,493 | 5/1965 | Chadwick . | |
| 3,398,965 | 8/1968 | Cox . | |
| 3,583,716 | 6/1971 | Daniel, Jr. | 279/81 |
| 3,750,283 | 8/1973 | Hoffman | 30/338 |
| 3,823,473 | 7/1974 | Hoffman | 30/338 |
| 3,927,893 | 12/1975 | Dillon et al. | 279/75 |
| 4,020,555 | 5/1977 | Hedrick | 30/392 |
| 4,204,692 | 5/1980 | Hoffman | 279/81 |
| 4,285,129 | 8/1981 | Hoffman | 30/392 |
| 4,299,402 | 11/1981 | Hoffman | 30/337 X |
| 4,441,255 | 4/1984 | Hoffman | 30/392 |
| 5,103,565 | 4/1992 | Holzer, Jr. | 30/392 |
| 5,324,052 | 6/1994 | Ortmann | 30/339 X |
| 5,340,129 | 8/1994 | Wright | 30/337 X |

FOREIGN PATENT DOCUMENTS

| | | |
|---|---|---|
| 0337685 | 10/1989 | European Pat. Off. . |
| 1041236 | 9/1956 | Germany . |
| 2015006 | 3/1970 | Germany . |
| 2500788 | 1/1975 | Germany . |
| 2753560 | 12/1977 | Germany . |
| 3118759A1 | 5/1981 | Germany . |
| 3006299A1 | 2/1982 | Germany . |
| 3247178A1 | 12/1982 | Germany . |
| 3245359A1 | 12/1982 | Germany . |
| 3428445A1 | 8/1984 | Germany . |
| 3505441A1 | 2/1985 | Germany . |
| 8513183 | 8/1985 | Germany . |
| 3622761A1 | 7/1986 | Germany . |
| 8702471 | 5/1987 | Germany . |
| 8907513 | 9/1989 | Germany . |
| 4102011A1 | 1/1991 | Germany . |
| EP88/00201 | 9/1989 | WIPO . |

*Primary Examiner*—Hwei-Siu Payer
*Attorney, Agent, or Firm*—Merchant, Gould, Smith, Edell, Welter & Schmidt, PP.A

[57] ABSTRACT

A clamping system for attaching a saw blade to a blade carrier of a reciprocating saw includes a clamp member having a tubular body and a hollow interior. The clamp member is mounted on the free end of a blade carrier which has a longitudinal slot for receiving the shank of a saw blade. The free end of the blade carrier has an aperture in its side wall. In a preferred embodiment a ball is received within the aperture and freely movable therein. The inner surface of the clamp member has an eccentric groove which defines a camming surface engaging the ball. Upon rotation of the clamp member to a locking position the ball engages an aperture in the shank of the blade to hold the blade in place. The clamp system is designed to accept saw blades having standard universal designs. In another preferred embodiment a pin is received within the aperture in the blade carrier. The pin has a first end which is adapted to be received within the aperture in the shank portion of the saw blade. The first pin has a first spherical segment defined by a first radius of curvature and a second spherical segment defined by a second radius of curvature greater than the first radius of curvature.

9 Claims, 7 Drawing Sheets

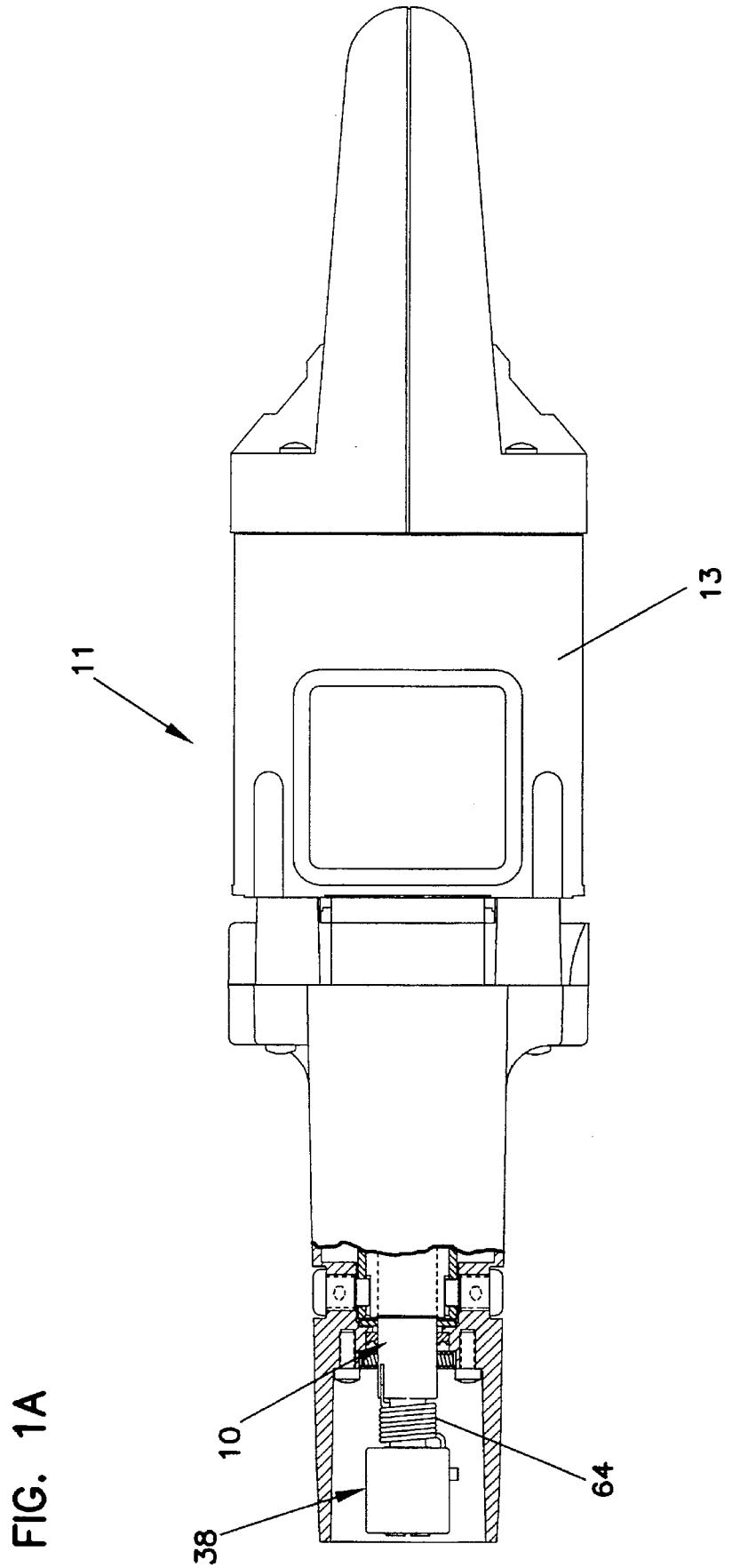

TOOLLESS QUICKCHANGE BLADE CLAMP FOR RECIPROCATING SAWS

This application is a continuation-in-part of application Ser. No. 08/183,717, filed Jan. 19, 1994, now abandoned.

BACKGROUND OF THE INVENTION

The present invention relates to reciprocating power saws and more specifically to a clamping system that permits the quick and easy removal and replacement of the blade. An inherent problem with reciprocating saws is that the blade of the saw quickly becomes dull and/or breaks requiring frequent blade changes. Prior art blade assemblies typically require a tool, such as a screwdriver or Allen wrench to change the blade. This is a slow and at times difficult process. Moreover, at times the required tool may not be available having been misplaced or lost. To address these problems a number of prior art designs use a blade clamp which does not require a tool.

For example, U.S. Pat. No. 3,583,716 discloses one such tool-less assembly for attaching and locking the saw blade in place. The shank of the saw blade is received within a slot in a saw bar which is driven by a motor. An aperture is provided in the shank of the blade. An aperture is likewise provided in the saw bar in communication with the slot receiving the blade shank. A ball is mounted in and freely removable within the aperture in the saw bar. A collar is mounted on the saw bar and is freely rotatable about the saw bar. The collar has an eccentrically grooved surface functioning as a cam surface engaging the ball. When the blade is inserted into the saw bar the collar is rotated to shift the ball to contact the aperture in the shank of the blade. In this position the blade is locked in place until the collar is rotated to an unlocked position. In order to stabilize the blade within the saw bar a pin is provided in the saw bar extending into the longitudinal slot. The shank of the saw blade is provided with a notch or recess which receives the pin seating the saw blade within the saw bar.

U.S. Pat. No. 3,823,473 also discloses a tool-less attachment means for a saber saw. The patent describes several embodiments of an attachment assembly where pins or balls engage the shank of a blade to secure the blade in place.

U.S. Pat. No. 3,927,893 also discloses an assembly adapted to engage the blade of a reciprocating tool and secure the blade in position. This apparatus includes a ball which is selectively engaged with a recess or dimple in a blade to seat the blade firmly in the assembly.

While these prior art patents describe a blade clamp assembly which does not require the use of a tool, each requires the use of a blade with a shank specifically designed for the patented structure. For example, in U.S. Pat. No. 3,583,716 the shank of the blade is provided with a notch that engages a pin in the tool bar to seat and stabilize the saw in the saw bar. Manufacturers of blades for reciprocating saws have standardized the width and length of the shank of the blade and the position of the aperture or hole in the shank. It is desirable for the power saw to accept blades having the standardized dimensions and configurations. The user of the saw is thus not limited in his ability to obtain acceptable replacement blades.

Thus, the design of the present invention was developed to provide a tool-less clamp assembly for a reciprocating saw which does not require a unique shank design but, on the other hand, will accept the standardized and universal shank design of many blade manufacturers.

In addition the attachment means for the saw blade must stabilize the blade and prevent movement of the blade when it is locked in the operative position. The prior art discloses a number of different such stabilization means. As mentioned, U.S. Pat. No. 3,583,716, for example, discloses a pin that is received in a recess in the shank of the blade. U.S. Pat. No. 5,103,565 discloses in one embodiment a blade holder for receiving a universal type blade where a pin is designed to engage a radiused surface on the shank. Despite the fact that such universal blades are standard in many respects, one cannot always rely upon the radiused surface engaged by the pin of the '565 patent to be in a standard location. It can be seen that these prior art patents disclose additional mechanical elements such as pins in order to stabilize the saw blade.

Accordingly, the present invention is also directed toward a clamp assembly which will affect blade stabilization without complex and unnecessary hardware designs.

SUMMARY OF THE INVENTION

The present invention is the combination in a reciprocating power saw of a blade carrier that is driven by a motor and which has a free end with a slot along its central longitudinal axis for receiving the shank portion of a saw blade wherein the shank portion has an aperture. The free end of the blade carrier further has an aperture in its sidewall that provides communication between the outer surface of the free end and the blade receiving slot. A clamp member comprising a tubular body and a hollow interior is mounted on the free end of the blade carrier. The inner surface of the clamp member has an eccentric groove. In the preferred embodiment the clamp member has a length measured along its longitudinal central axis that is at least equivalent to the length of the shank portion of the blade. The inner diameter of the clamp member is substantially equivalent to the width of the shank portion of the blade. The clamp member is attached to the blade carrier for rotation between first and second positions. It has a means captured in the aperture of the free end of the blade carrier and in engagement with the eccentric groove in the clamp member for cooperating with the aperture in the shank portion to secure the saw blade to the blade carrier when the clamp member is in a first position. When the clamp member is rotated to a second position the saw blade is released for removal.

In a preferred embodiment a ball is mounted within the aperture in the sidewall of the blade carrier and is freely movable within the aperture. The eccentric groove in the inner surface of the clamp member functions as a camming surface forcing the ball to engage the aperture in the shank portion of the blade in the first position of the clamp member. A torsion spring is attached to the blade carrier and the clamp member to bias the clamp member toward its first or locking position.

In another preferred embodiment of the present invention a self-cleaning pin is mounted within the aperture in the side wall of the blade carrier. The pin has a body portion and a first end adapted to be received within the aperture within the shank portion of the blade and a second end engaging the eccentric groove in the inner surface of the clamp member. The first end of the pin has a first spherical segment defined by a first spherical diameter or radius and a second spherical segment defined by a second spherical diameter or radius which is greater than the first spherical diameter or radius. This construction increases the depth of engagement between the pin and the blade, therefore increasing the holding strength. At the same time the larger spherical diameter of the second segment facilitates the insertion of the blade into the slot in the blade carrier. The body member of the pin intermediate its first and second ends has a first outside diameter that is substantially equal to the size of the aperture so that the body portion slidably engages the aperture walls. The body member is further provided with a recessed portion with an outside diameter smaller than the outside diameter of the body portion. This recessed portion defines a space between the body portion and aperture walls. This space allows debris that may tend to accumulate to fall away from the interface between the pin and aperture walls. This reduces the likelihood that the clamp mechanism may bind due to contamination.

The present invention thus incorporates a tool-less clamp assembly that will accept a saw blade of universal and standardized design. The clamp assembly is dimensioned and constructed so that in the locked position the blade is stabilized eliminating the need for incorporating stabilizing hardware into the clamp. These and other advantages of the present invention will become apparent with reference to the accompanying drawings, detailed description of the preferred embodiment and claims.

BRIEF DESCRIPTION OF THE DRAWINGS

FIG. 1A illustrates the present invention connected to a power saw by any of well known prior art techniques;

DETAILED DESCRIPTION OF THE PREFERRED EMBODIMENT

Figure 1:
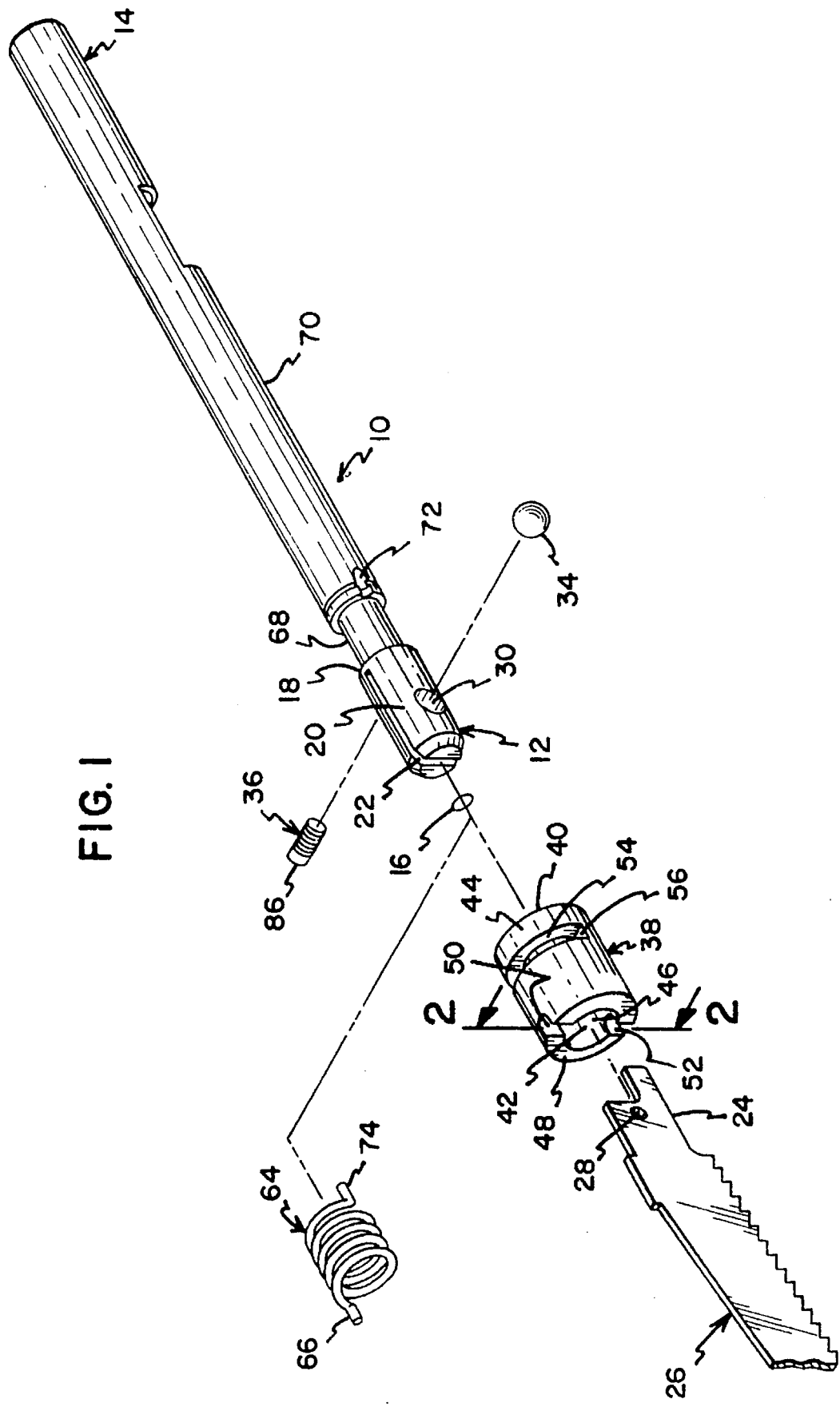
FIG. 1 is an exploded view in perspective illustrating a preferred embodiment of the present invention.

Referring to the drawings, wherein like numerals represent like parts throughout the several views, there is illustrated a blade carrier 10 having a free end 12 and an end 14 which is operatively connected to a motor (not shown) of a power saw to impart reciprocating motion to blade carrier 10 along its central longitudinal axis as shown at 16. FIG. 1A illustrates a power saw 11 having a housing 13 in which is mounted a motor (not shown) to impart reciprocating motion to blade carrier 10. The motor may be connected to blade carrier 10 by any one of a number of prior art techniques known to those skilled in the art. Free end 12 has a cylindrical head 18 and an outer surface 20. Head 18 has a slot 22 disposed therein along longitudinal axis 16. Slot 22 is adapted to receive a shank member 24 of a saw blade 26. Shank member 24 is a standardized or universal design adapted for use with any conventional reciprocating power saw. Thus, as shown more specifically in FIG. 2 shank member 24 has a standardized width as indicated at X and a standardized length as indicated at Y. Disposed at a standardized location on shank member 24 is an aperture 28.

Cylindrical head 18 has an aperture 30 providing communication between outer surface 20 and slot 22. Head 18 is provided with a second aperture (not shown) on the opposite side of cylindrical head 18 from aperture 30 also providing communication between outer surface 20 and slot 22. A ball 34 is received within aperture 30 and has a diameter selected such that ball 34 will move freely within aperture 30 as will be described in more detail hereafter. A pin having a diameter selected such that it will freely move within aperture 30 and having rounded ends may also be used in lieu of ball 34. Aperture 32 is adapted to receive a stop pin 36. In one embodiment pin 36 may be a roll or spring pin and aperture 32 may be a smooth bore in which the spring pin is received. In an alternative embodiment second aperture 32 may be threaded and pin 36 may be provided with external threads that mate with the threads of aperture 32.

Figure 2:
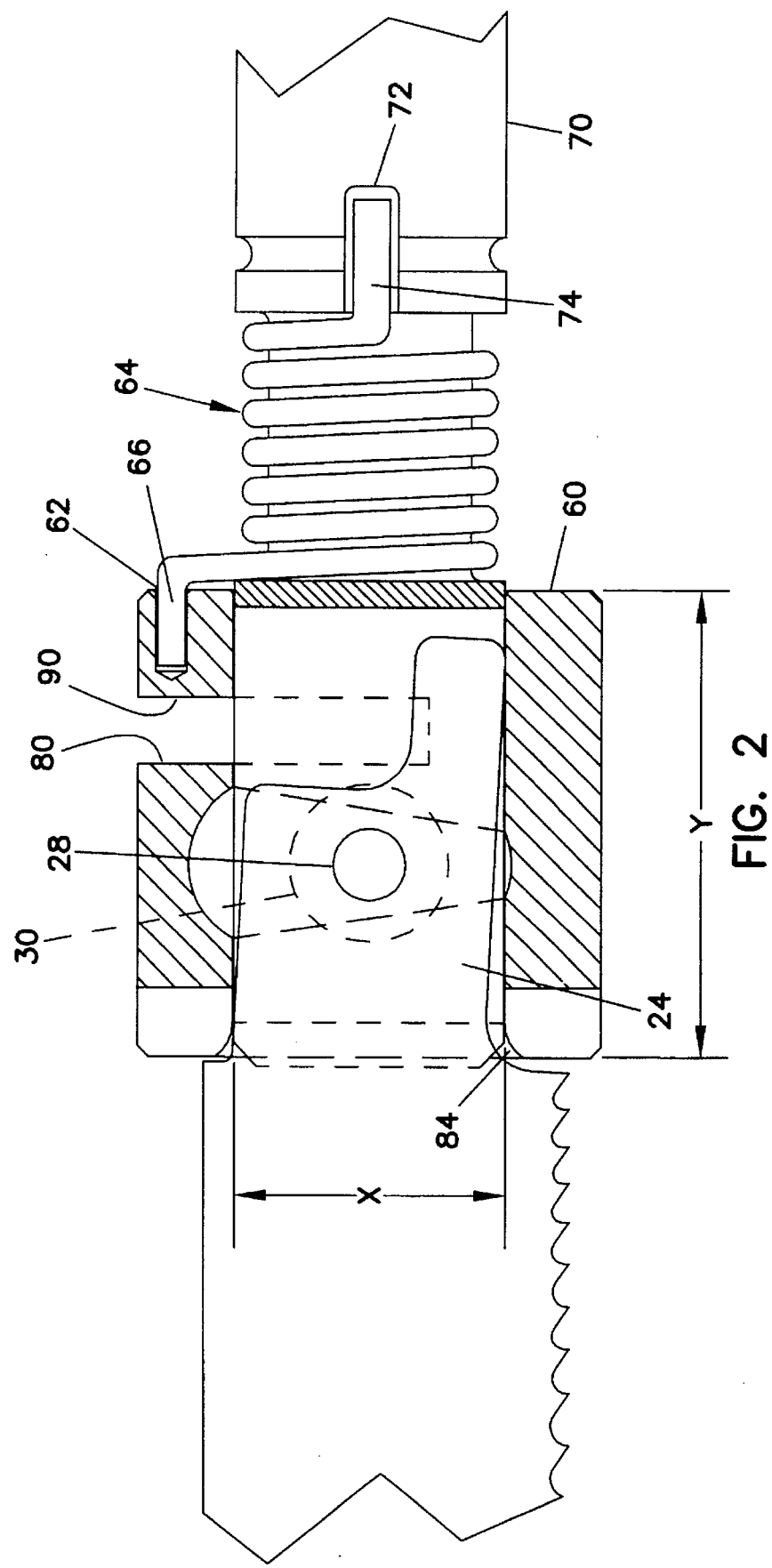
FIG. 2 is a view in cross section taken along lines 2—2 of FIG. 1.
Figure 3D:
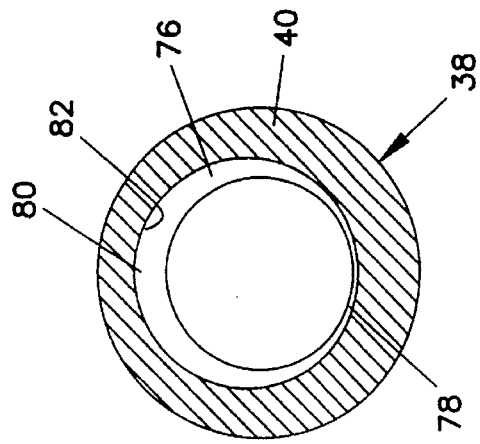
FIGS. 3A–3D are elevational and sectional drawings of the collar of the embodiment of the invention of FIGS. 1–2.
Figure 3A:
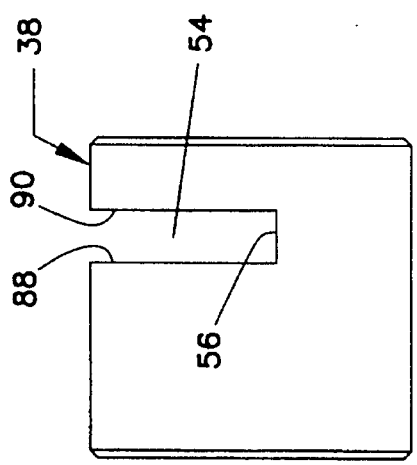
Figure 3C:
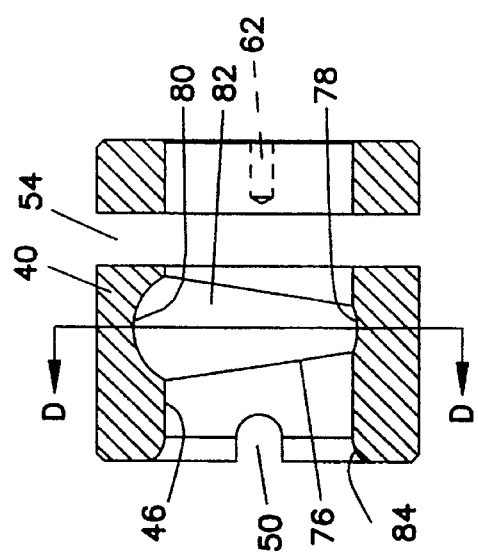
Figure 3B:
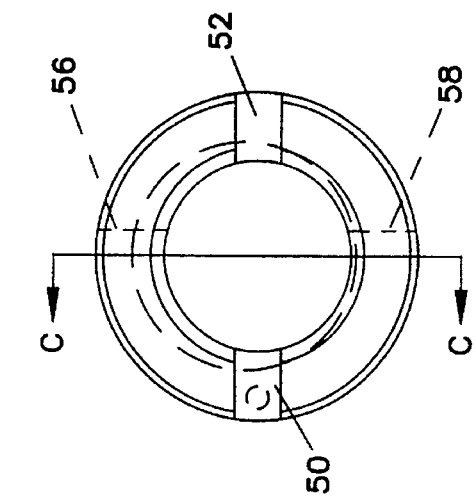

A clamp collar 38 is mounted on cylindrical head 18. Clamp collar 38 has a tubular body member 40 with a hollow interior 42, an outer surface 44 and an inner surface 46. Body member 40 has an inner diameter selected to be only slightly greater than the width X of shank member 24. Body member 40 has an outer end 48 and a pair of notches 50 and 52 spaced 180 degrees from each other about the circumference of outer end 48. In one embodiment of the present invention body member 40 has a slot 54 providing an opening between outer surface 44 and inner surface 46. Slot 54 extends partially about the circumference of body member 40. Slot 54 defines a pair of stop surfaces 56 and 58 the purpose of which will be described in more detail hereafter. Turning specifically to FIGS. 2 and 3, body member 40 has an inner end 60 having a recess at 62. A torsion spring 64 has a first end 66 which is received within recess 62. Torsion spring 64 is coiled about a section 68 of blade carrier 10. A section 70 of blade carrier 10 is provided with a recess 72 in which is received an end 74 of torsion spring 64.

Torsion spring 64 biases clamp collar 38 toward a first position corresponding to blade 26 being locked in carrier 10. FIG. 3 illustrates the structure of clamp collar 38 in more detail. Inner surface 46 of tubular member 40 is provided with an eccentric circumferential groove 76 shown specifically in FIGS. 3c and 3d. Groove 76 varies in depth from a minimum at 78 to a maximum at 80. Groove 76 defines a camming surface 82.

The operation of the present invention will now be described with reference to the embodiment of FIGS. 1–3. As stated previously ball 34 is received within aperture 30 and freely movable within aperture 30. Ball 34 is captured in eccentric groove 76 as clamp collar 38 rotates about cylindrical head 18. Ball 34 under the influence of camming surface 82 is urged inward toward central axis 16 to the first or locked position of collar 38 and allowed to move outward or away from axis 16 toward a second or unlocked position of collar 38. In the first or locked position ball 34 seats at least partially in aperture 28 of shank member 24 to secure blade 26. When collar 38 is rotated to its second position ball 34 is disengaged from aperture 28 allowing blade 26 to be removed. By positively biasing clamp collar 38 toward the first or locked position there is no loosening of blade 26 due to vibration during operation of the saw. On the other hand the positive biasing force of torsion spring 64 toward the locked position tightens clamp collar 38 with vibration. Aperture 30 and ball 34 are positioned with respect to outer end 48 of clamp collar 38 so that blade 26 is restrained from pivoting about ball 34. This is accomplished by locating aperture 30 and ball 34 on cylindrical head 18 in a position such that blade 26 will engage a radiused surface 84 upon minimal pivoting of blade 26.

Further by sizing clamp collar 38 such that its inside diameter is substantially equal to the width X of shank portion 24 and such that its length is at least as great as the length Y of shank portion 24, blade 26 is stabilized by the single ball 34 and collar 38 assembly. Pin 36 serves two functions. First, pin 36 is inserted into aperture 32 such that a portion of pin 36 projects outward from surface 20 of cylindrical head 18. Pin portion 86 rides within slot 54. When blade 26 is removed pin 36 retains collar 38 on cylindrical head 18 through the engagement of pin 36 with sidewalls 88 and 90 of slot 54. Upon rotation of collar 38, portion 86 of pin 36 will engage stop surfaces 56 and 58 to limit rotation of clamp collar 38 so that torsion spring 64 cannot be damaged by over-rotation in one direction and in the other direction to maintain a preloaded tension on clamp collar 38 when blade 26 is removed.

Notches 50 and 52 formed in outer end 48 provide a means to remove broken blade shanks. Notches 50 and 52 have a depth measured along central axis 16 that extends beyond where breaks usually occur in shank 24. A broken shank thus can be removed by aligning notches 50 and 52 with slot 22 and a replacement blade may be used to pry the broken shank from cylindrical head 18.

Figure 4:
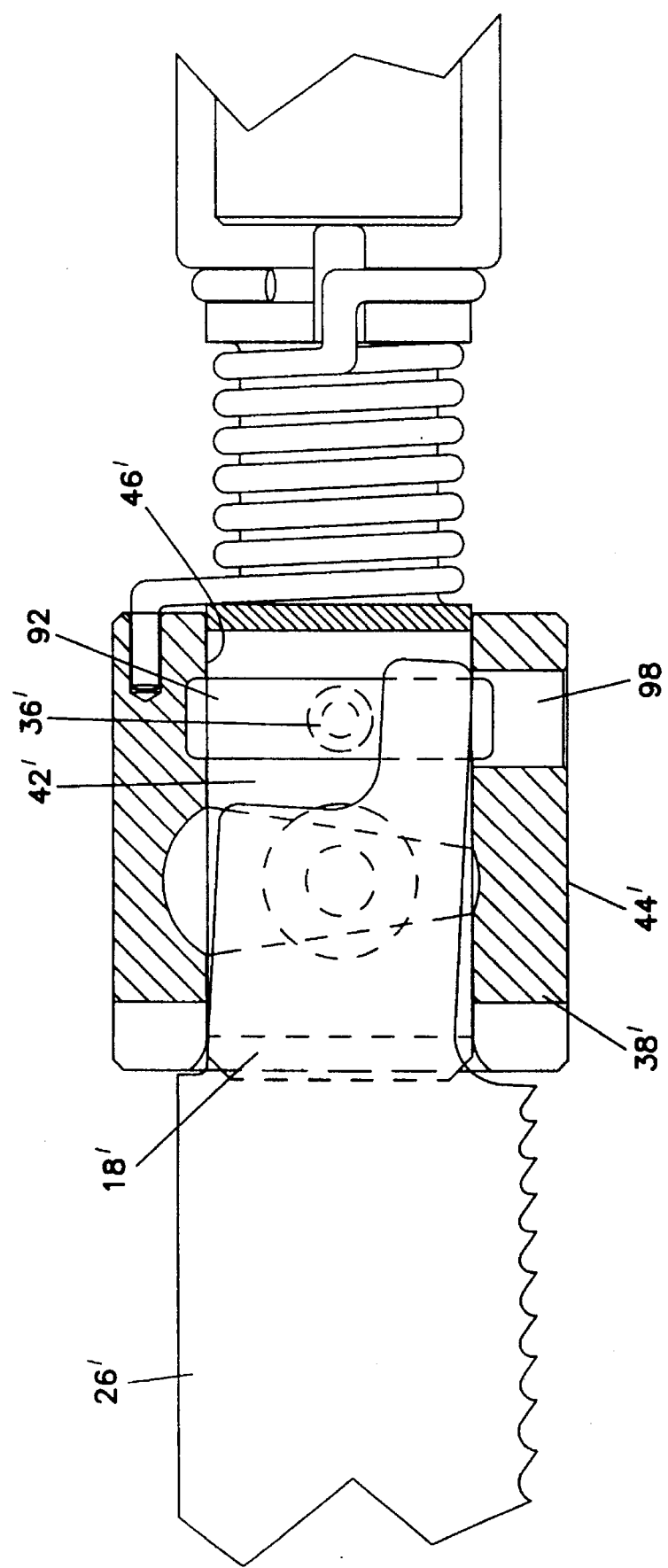
FIG. 4 is a view in cross section similar to FIG. 2 but showing an alternative embodiment of the present invention.
Figure 5D:
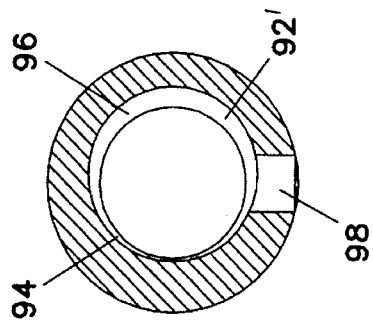
FIGS. 5A–D are elevational and sectional drawings of the collar of the embodiment of the invention of FIG. 4.
Figure 5C:
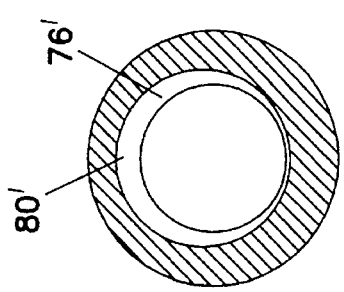
Figure 5B:
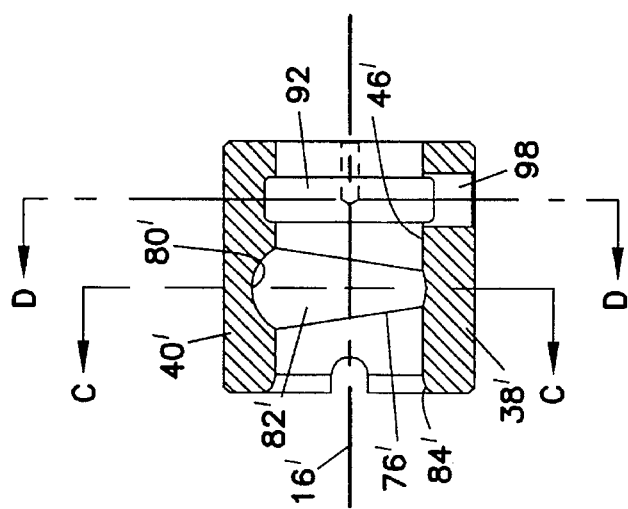
Figure 5A:
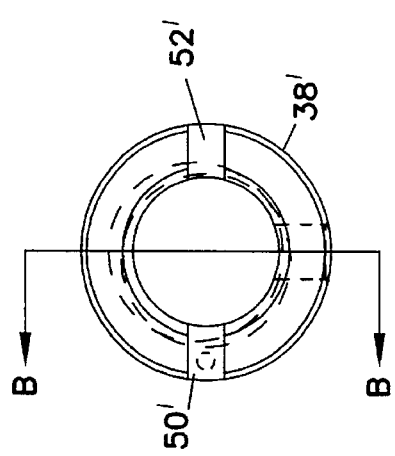

FIGS. 4–5 illustrate an alternative embodiment of the present invention. Instead of slot 54 a second eccentric groove 92 is formed on inner surface 46'. Groove 92 extends about a portion of the circumference of clamp collar 38' as illustrated in FIG. 5D. Eccentric groove 92, like groove 76', also varies in depth from a minimum at 94 to a maximum at 96. Second eccentric groove 92 as shown in FIGS. 5C and 5D is essentially 90 degrees out of phase with respect to eccentric groove 76'. In other words maximum depth 96 of groove 92 is positioned about central axis 16' 90 degrees from the location of maximum depth 80' of eccentric groove 76'. An aperture 98 is located in tubular body member 38' permitting communication between outer surface 44' and hollow interior 42'. Aperture 98 is located to provide access to cylindrical member 18' at the position of eccentric groove 92. In this embodiment set screw or roll pin 36' has a stop portion similar to stop portion 86 shown in FIG. 1 projecting above the outer surface of cylindrical head 18'. Stop portion 86' is captured in eccentric groove 92. In this manner roll pin 36' functions to retain clamp collar 38' on cylindrical head 18' when blade 26' is removed. Pin 36' also cooperates with groove 92 to limit the rotation of clamp collar 38' as described above with references to FIGS. 1–3.

Figure 6:
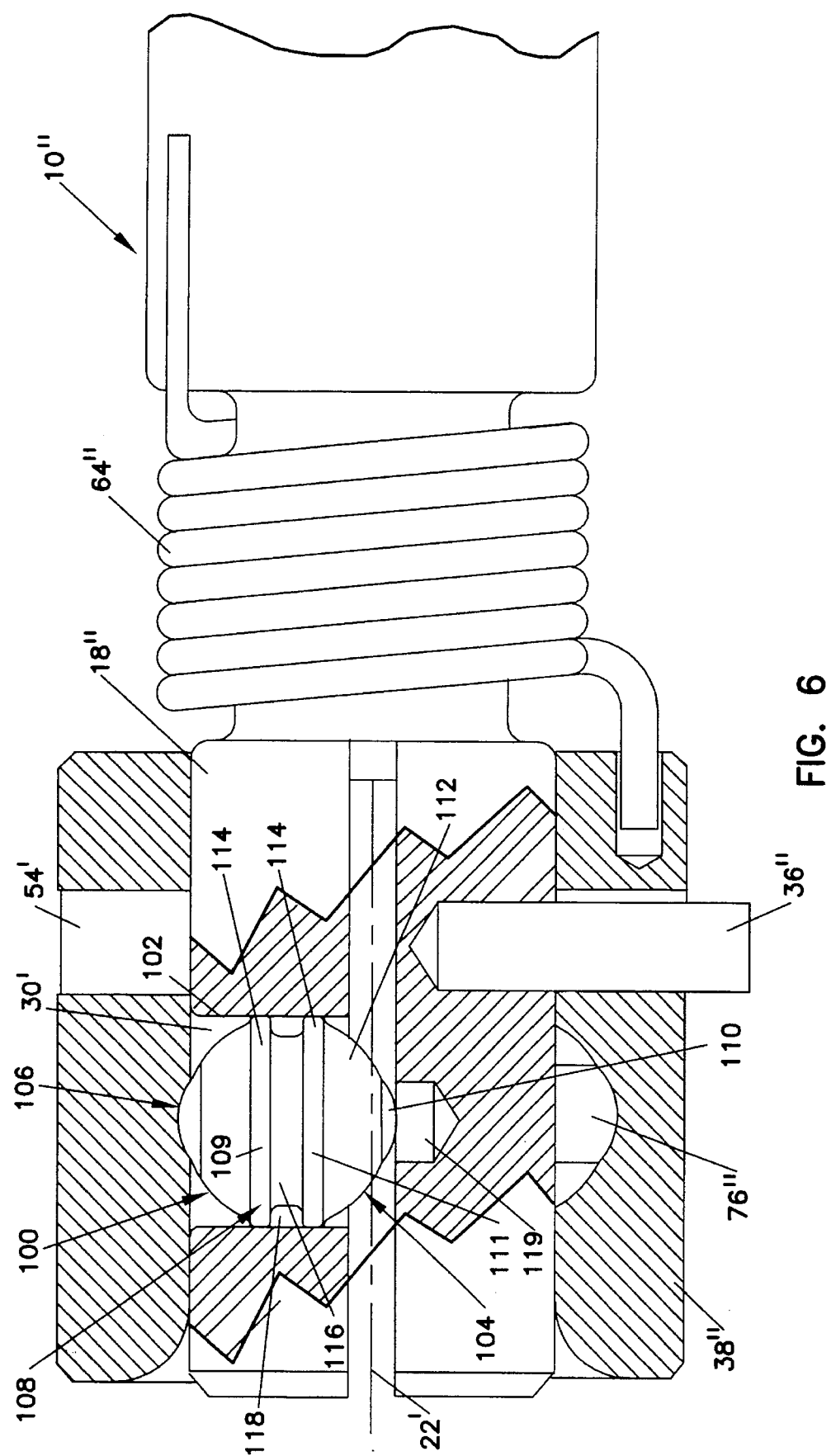
FIG. 6 is a view showing an alternative embodiment of the present invention utilizing a specially designed pin adapted to engage the aperture in the shank portion of the blade.

FIG. 6 illustrates an alternative embodiment of the present invention where a pin 100 is received within an aperture 30' in cylindrical member 18" of blade carrier 10". Aperture 30' is defined by an aperture side wall 102. Pin 100 has a first end 104, a second end 106, and an intermediate body member 108 disposed along a longitudinal axis. First end 104 has a first spherical segment 110 defined by a first radius of curvature or spherical diameter and a second spherical segment 112 defined by a second radius of curvature or spherical diameter. The second radius of curvature is greater than the first radius of curvature. In the preferred embodiment second end 106 has the same construction as first end 104 of pin 100. Second end 106 is positioned to be received within eccentric groove 76" in collar 38". Body member 108 has an outside diameter measured perpendicular to the longitudinal axis of pin 100 and which is substantially equal to the size of aperture 30' defining two land regions 109 and 111. Land regions 109 and 111 slidably engage side wall 102 as shown, for example, at 114. Body member 108 has recessed portion 116 between land regions 109 and 111 and which has an outside diameter which is smaller than the size of aperture 30'. Thus, a space 118 is created between recessed portion 116 and side wall 102. Space 118 allows for any accumulated debris to fall away from the interface between pin 100 and sidewall 102 of aperture 30'. This construction reduces the possibility of the clamp mechanism binding due to contamination. By positioning recessed portion 116 at the mid-section of pin 100, the pin maximum length to diameter ratio can be maintained ensuring a stable pin for the clamping function. Also shown in FIG. 6 is pin 36" received within slot 54' of clamp 38". Pin 36" serves the same function as described above with respect to the first embodiment. Also shown in FIG. 6 is torsion spring 64" which also functions as described above in the first embodiment of the invention. Member 18" has a recess at 119 which facilitates the assembly of pin 100 into member 18" and clamp 38". In operation, first end 104 of pin 100 in the locked position is received within aperture 28 in shank portion 24 of saw blade 26. The smaller spherical diameter or radius of curvature of first spherical segment 110 increases the depth of engagement of first end 104 within aperture 28 and therefore the holding strength is increased. Providing a larger spherical diameter or radius of curvature on second spherical segment 112 facilitates the ease of insertion of blade 26 into slot 22'.

It should be appreciated that the above disclosure is illustrative and changes may be made in detail, especially in matters of shape, size and arrangement of parts within the spirit and scope of the present invention.

From the above description it should be apparent that the present invention provides a quick and easy clamp assembly with minimum mechanical parts. By virtue of its unique design the clamp assembly functions with blades of universal and standardized configuration.

What is claimed is:

1. In a reciprocating power saw having a motor for driving a saw blade having a shank portion with an aperture formed therein, the improvement comprising:

a blade carrier driven by said motor and having a free end, said free end having a slot formed therein along a central longitudinal axis thereof in which said shank portion of said saw blade is received, said free end further having an aperture in its sidewall providing communication between an outer surface of said free end and said slot;

a clamp member having tubular body and a hollow interior in which said free end of said blade carrier is received, said clamp member having a first and a second eccentric grooves formed in its inner surface, said clamp member further having an inside diameter corresponding generally to the width of said shank portion of said saw blade;

means for attaching said clamp member to said free end of said blade carrier for rotation about said free end between at least first and second positions;

means captured in said aperture in said free end of said blade carrier and in engagement with said first eccentric groove for cooperating with said aperture in said shank portion to secure said blade to said blade carrier when said clamp member is in said first position and release said blade when said clamp member is in said second position; and means attached to said free end of said blade carrier and received within said second eccentric groove to retain said clamp member on said free end and limit rotation of said clamp member between said first and second positions.

2. The improvement according to claim 1 wherein said tubular body has a slot extending partially about its circumference and further comprising a stop means attached to said free end of said blade carrier for cooperating with said slot in said tubular body to limit rotation of said clamp member between said first and second positions.

3. The improvement according to claim 1 wherein said second eccentric groove extends partially about the inner surface of said tubular body defining stop means for limiting rotation of said clamp member between said first and second positions.

4. The improvement in accordance with claim 1 further comprising a torsion spring means attached to said blade carrier and said clamp member for biasing said clamp member toward said first position.

5. The improvement according to claim 1 wherein said tubular body has a pair of notches in one end thereof into which said blade is inserted, said notches oppositely disposed about the circumference of said tubular body so that said notches are aligned with said slot in said free end of said blade carrier when said clamp member is in said second position.

6. In a reciprocating power saw having a motor for driving a saw blade having a shank portion with an aperture formed therein the improvement comprising:

a blade carrier operatively connected to said motor, said blade carrier having a free end with an elongated slot formed therein along a central longitudinal axis of said blade carrier, said slot adapted to receive shank portion of said blade, said blade carrier further having first and second apertures in its sidewall providing communication between an outer surface of said free end and said slot;

a clamp member having a tubular body and a hollow interior in which said free end of said blade carrier is received, said tubular body having a slot extending partially about is circumference providing communication between an outer surface of said tubular body and said hollow interior, said tubular body having an inner surface with an eccentric groove formed therein and extending circumferentially about said inner surface;

a ball received within the said first aperture in said blade carrier and freely movable within said first aperture, said ball captured within said eccentric groove and adapted to be movable into engagement with the aperture in the shank portion of the blade, a stop pin mounted within said second aperture in said blade carrier and having a stop portion captured within said slot in said clamp member to retain said clamp member on said free end;

a torsion spring attached to said blade carrier and to said clamp member biasing said clamp member toward a first position wherein said ball is urged into engagement with said aperture in said shank portion of said blade to secure said blade carrier, said clamp member rotatable from said first position to a second position wherein said ball disengages from said aperture in said shank portion allowing said blade to be removed from said blade carrier.

7. The improvement in accordance with claim 6 wherein said clamp member has a pair of notches in one end thereof in which said blade is inserted, said notches diametrically disposed with respect to each other whereby upon rotation of said clamp member to said second position said notches are in general alignment with said slot in said blade carrier.

8. In a reciprocating power saw having a motor for driving a saw blade having a shank portion with an aperture formed therein, the improvement comprising:

a blade carrier driven by the motor and having a free end, said free end having a slot formed therein along a central longitudinal axis thereof in which the shank portion of the saw blade is received, said free end further having an aperture in its sidewall providing communication between an outer surface of said free end and said slot;

a clamp member having a tubular body and a hollow interior in which said free end of blade carrier is received, said clamp member having a first eccentric groove formed in its inner surface, said clamp member further having an inside diameter corresponding generally to the width of the shank portion of the saw blade;

means for attaching said clamp member to said free end of said blade carrier for rotation about said free end between at least first and second positions;

a pin member slidably received within said aperture in said free end of said blade carrier and in engagement with said first eccentric groove, said pin member having a first end adapted to be received within the aperture in the shank portion to secure the blade to said blade carrier when said clamp member is in said first position and release the blade when said clamp member is in said second position, said first end of said pin member having a first spherical segment defined by a first radius of curvature and a second spherical segment defined by a second radius of curvature, said first radius being smaller than said second radius.

9. In a reciprocating power saw having a motor for driving a saw blade having a shank portion with an aperture formed therein, the improvement comprising:

a blade carrier driven by the motor and having a free end, said free end having a slot formed therein along a central longitudinal axis thereof in which the shank portion of the saw blade is received, said free end further having an aperture in its sidewall providing communication between an outer surface of said free end and said slot;

a clamp member having tubular body and a hollow interior in which said free end of said blade carrier is received, said clamp member having a first eccentric groove formed in its inner surface, said clamp member further having an inside diameter corresponding generally to the width of the shank portion of the saw blade;

means for attaching said clamp member to said free end of said blade carrier for rotation about said free end between at least first and second positions;

a pin member slidably received within said aperture in said free end of said blade carrier and in engagement with said first eccentric groove, said pin member having a first end adapted to be received within the aperture of the shank portion to secure the blade to said blade carrier when said clamp member is in said first position and release the blade when said clamp member is in said second position, said pin member further having a first body portion with an outside diameter substantially equal to the size of said aperture in said blade carrier and a second body portion having an outside diameter less than said outside diameter of said first portion thereby defining a space for accumulated debris to fall away from the interface between said pin member and said aperture of said blade carrier.

* * * * *